US007107518B2

(12) United States Patent
Ramaley et al.

(10) Patent No.: US 7,107,518 B2
(45) Date of Patent: Sep. 12, 2006

(54) AUTOMATING A DOCUMENT REVIEW CYCLE

(75) Inventors: Alan Ramaley, Seattle, WA (US); Valerie Serdy, Sammamish, WA (US); Sean Erik McAteer, Seattle, WA (US); Suresh Tharamal, Sammamish, WA (US); Thomas Olsen, Issaquah, WA (US); Noah Edelstein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1095 days.

(21) Appl. No.: 09/825,270

(22) Filed: Apr. 3, 2001

(65) Prior Publication Data

US 2002/0143691 A1 Oct. 3, 2002

(51) Int. Cl.
*G06F 15/00* (2006.01)
*G06F 17/00* (2006.01)

(52) U.S. Cl. .................. 715/501.1; 715/512; 715/513; 715/530

(58) Field of Classification Search ............ 715/501.1, 715/530, 512–513
See application file for complete search history.

(56) References Cited

U.S. PATENT DOCUMENTS

| | | | | |
|---|---|---|---|---|
| 5,706,452 | A * | 1/1998 | Ivanov ........................ | 715/751 |
| 6,243,722 | B1 * | 6/2001 | Day et al. ..................... | 715/512 |
| 6,247,032 | B1 * | 6/2001 | Bernardo et al. ............ | 715/530 |
| 6,493,731 | B1 * | 12/2002 | Jones et al. ............... | 715/501.1 |
| 6,931,592 | B1 * | 8/2005 | Ramaley et al. ............. | 715/530 |
| 2002/0161597 | A1 * | 10/2002 | Klibaner ...................... | 705/1 |

OTHER PUBLICATIONS

Edwards, M. Lloyd, A Peer Review Experience, ACM SIGUCCS Conference on User Services, Oct. 1981, pp. 86-90.*
*Managing multi-party documents in a network computing environment*; S. Chow; Software-Practice & Experience; 28, 12 (Oct. 1998) pp. 1315-1325.
*Intelligent access, publishing and collaboration in global engineering networking*; I. Faux, E. Radeke, F.J. Stewing, G. VanderBrock, P. Kasteloot, and A. Sabin; Compute Networks and ISDN Systems, 30, 13 (Aug. 3, 1998) pp. 1249-1262.
*Ensuring online information usability*; T. Chance; *Electronic Library* 11, 4-5 (Aug.-Oct. 1993) pp. 237-239.
*Distributed authoring on the Web with the BSCW shared workspace system*; Thilo Horstman and Richard Bentley; *StandardView* 5, 1 (Mar. 1997) pp. 9-16.
*Integrated document management for science and engineering*; David F. Cahn; Proceedings of the International Conference on Systems, Man and Cybernetics, 1983, pp. 836-840.
*Distributed interoffice mail system based on integrated document interchange protocols*; 6th Conference on Electronics, EUROCON 84: Computers in communication and control, 1984, pp. 14-18.

(Continued)

Primary Examiner—William Bashore
(74) Attorney, Agent, or Firm—Merchant & Gould, LLC (57) ABSTRACT

An automated review cycle automatically merges changes in a reviewed document into an original document and by provides reviewing tools on a context-sensitive basis. The automated review cycle can operate within the environments of a document management system, a link-based document collaboration system (e.g., common server), or an attachment-based collaboration system. By generating a review cycle identification number (RCID) and by maintaining other information about the review cycle in a configuration file, an original author and a reviewer of a document can be distinguished and can be provided the appropriate prompts and tools to facilitate the document review process.

9 Claims, 9 Drawing Sheets

OTHER PUBLICATIONS

*Putting documents into their work context in document analysis*; A. Salminen, V. Lyytikainen, P. Tiitinen; *Information Processing & Management* 36, 4 (Jul. 2000) pp. 623-641.

*Integrating document management with project and company data*; D. Hajjar and S.M. AbouRizk; *Journal of Computing in Civil Engineering* 14, 1 (Jan. 2000) pp. 70-77.

*Managing complex documents over the WWW: A case study for XML*; P Ciancarini, F. Vitali and C. Maseolo; *IEEE Transactions on Knowledge and Data Engineering* 11, 4 (Jul.-Aug. 1999) pp. 629-638.

*A prototype multimedia database system*; H. Ishikawa; *Fujitsu Scientific & Technical Journal* 33, 2 (1997) pp. 145-159.

* cited by examiner

AUTOMATING A DOCUMENT REVIEW CYCLE

FIELD OF THE INVENTION

The present invention generally relates to sending a document from a document author to a reviewer for review. More particularly, the present invention relates to automating a review cycle by automatically determining whether the document has been received by the author or by a reviewer.

BACKGROUND OF THE INVENTION

Document editors permit a document author to create and modify electronic documents such as word processing documents, spreadsheet documents, multimedia presentations, images, and sounds. Oftentimes, the author of a document may want to send the document to one or more reviewers to solicit comment and/or modifications to the document. Electronic mail (email) provides a convenient and commonly used mechanism for sending such documents to reviewers.

One of the most common document collaboration processes is document reviewing. Users typically perform document reviewing by using either an automated document management system or by manually routing copies of a document to potential reviewers.

Generally, a review cycle is considered to be the review process beginning with the author's transmitting a duplicate of an original document (or a link to the original document) to one or more reviewers and ending with the merging of the last reviewer's changes into the original document. The review cycle is typically begun by a trigger. A document author can trigger the beginning of a review cycle by choosing to send the original document to a recipient by email. This command is typically available in the menu structure of most document editors and/or email clients. Typically, the author can choose whether to send the document as an attachment or a link. The review cycle can also be triggered by an author selecting to send an original document for review within the context of a document management system.

Manual document reviewing involves an author's sending to potential reviewers a document either as an attachment to an email or as a link to a document maintained in a shared document location (e.g., on a common server). In the case where the document is sent as an attachment, the reviewer reads and edits the document and then returns the document to the author as an attachment to a reply email. In this case, the author receives an edited document for each reviewer that returns an attachment. The author is required to merge the changes from each of the reviewed documents into the original document and reconcile any conflicting changes.

In the case where the original document (i.e., the document created by the author) is a single document at a location on the server, each reviewer must access the original document and modify it. This reduces the necessity to merge changes into the original document, because the changes are actually made to the original document. However, this process also requires that only one reviewer can work on the document at a time. This review process is often not conducive with the users' need for an efficient and timely review cycle.

In the case where the document is managed within an automated document management system, the document management system will typically permit simultaneous editing of a document within the system, and will perform change merging automatically. However, most users do not employ document management systems as they are expensive and unwieldy for smaller organizations. Moreover, document management systems typically require the installation of a special kind of server.

A document editor may permit a sender to send a file to a recipient as either an attachment to an email note (in conjunction with an email client), or as a "link" to a shared disk location. As used herein, the term "link" refers to a reference, such as a uniform resource locator (URL), which points to the disk location where the file is stored. A link is typically "hot" or "active," such that when the recipient clicks on the link when executing the appropriate application program, the application program will attempt to automatically retrieve the file from its shared disk location.

Document editors typically interact with an email application program in order to create a new email note. The document author may instruct the document editor or the email application program to send a document file to a reviewer by email. The email application program may then create a copy of the document file and attach the copy to the new email note. The sender may then complete the mail note by, for example, indicating the recipient's email address and typing a message into the body of the email note. Thus, a copy of the document file will be sent to the recipient as an attachment to the email file.

Document editors also can typically interact with an email application program to send a link to a document authored in the document editor. The email application program creates a link to the shared document location of the file and inserts the link into the body of a new email note. The desktop application may also insert the link into a "link file" that is sent as an attachment to the new email note. The link file contains the link and not the actual document file that the sender intends for the recipient to access. Again, the sender may complete the email note by, for example, indicating the recipient's email address and typing a message into the body of the email note.

Unfortunately, existing document editors and email application programs do not provide an automated review cycle. That is, the user is required to determine the status of a document in a review cycle. The user must determine whether merging a reviewed document and an original document is appropriate. The user must also determine which reviewing tools to display at that stage of the review cycle and then, the user must manually access those tools.

Therefore, there is a need in the art for a document review system that does not require a specialized server and can support either attachment-based or link-based document collaboration to automate a review cycle by automatically providing reviewing tools in a context-sensitive manner.

SUMMARY OF THE INVENTION

The present invention meets the above-described needs by providing a means for automating a document review cycle by automatically merging changes in a reviewed document into an original document and by providing reviewing tools on a context-sensitive basis. The present invention can operate within the environments of a document management system, a link-based document collaboration system (e.g., a system having a common server), or an attachment-based collaboration system. By generating a review cycle identification number and by maintaining other information about the review cycle in a configuration file, the present invention distinguishes between an original author and a reviewer and can provide the appropriate prompts and reviewing tools to automate the document review process.

A review cycle begins with a document author's transmitting an original document to one or more reviewers and ends with the merging of the last reviewer's changes into the original document. Generally, the review cycle is begun by a trigger. A document author can trigger the beginning of a review cycle by choosing to send the original document to a recipient by email. This command is typically available in the menu structure of most document editors and/or email clients. Typically, the author can choose whether to send the document as an attachment or a link. The review cycle can also be triggered by an author selecting to send an original document for review within the context of a document management system.

The first step of the automated review cycle is to determine whether the original document is mergeable. That is, a determination must be made as to whether changes in reviewed documents can be merged back into the original document. If not, the author can be prompted to convert the original document into a mergeable document. Once the document is rendered mergeable, then changes received from reviewers can be merged into the original document.

The next step of the automated review cycle is to determine whether to send the review copy as a link or an attachment. If the author is working within the context of a document management system, the document can be sent as a link (i.e., a reference to the original document's location within the document management system). Likewise, if the author is working with an original document that is stored on a common server (i.e., in a shared location), the document can be sent as either an attachment or a link. The author's pre-configured preferences as to whether the review document is sent as an attachment or a link can be stored and referenced. If the original document exists only on a local drive, then the review document must be sent as an attachment.

Once a determination has been made as to whether the document will be sent as a link or as an attachment, a review request can be prepared in the form of an email note. In the context of the document management system, a review request can also be any other kind of electronic message indicating to the recipient that the document author requests the recipient's review of that document. In the case of a new email note, the new email note must first be initialized. Initialization can include such steps as adding a default subject line, setting a "follow-up flag", and setting a default message text (e.g., the link plus some instructional text). The attachment and/or email note can also be stamped with a review cycle identification number (RCID). The RCID number can be generated from an encoding of the document path and a unique identification number associated with the machine on which the original document was created. The RCID is used to determine who has opened the document and to determine the status of the document in the review cycle. The RCID can be stored in a configuration file, such as a registry. Once the email note has been initialized, it can be displayed to the original document author. At this point, the author can edit the note and/or send the note to the intended recipients (i.e., reviewers).

When a recipient receives an email note with the document attached, the recipient can open the review document by clicking on a predetermined portion of the email note. At this point, a determination will be made as to whether the review document has an associated RCID. If the document has an associated RCID, a determination is made as to whether the RCID is in a configuration file (e.g., a registry). If the RCID is not in the configuration file, then it is assumed that the user opening the document is reviewer rather than the document's author. In addition, the reviewing tools display flag can be checked. If the reviewing tools display flag is set, then it can be assumed that the reviewer has previously opened the document and the reviewing tools need not be shown. On the other hand, if the reviewing tools flag has not been set, then the reviewing tools may be shown for use by the reviewer. If the reviewing tools are shown to the reviewer, then a reviewing tools flag may be set, to avoid showing the reviewer the reviewing tools again, if the document is subsequently opened by the reviewer.

When a review document is received and saved to disk, a means for tracking the document to its carrier email note can be implemented. An email EntryID and an email StoreID (or other identifying information) can be saved with the review document. The email EntryID and the email StoreID both track an email note, so that the attachment can be matched to the email note. This is particularly useful to return the reviewed document to the author.

In one aspect of the present invention, the reviewing tools include a "Reply with Changes" button that is displayed with the reviewing tools when a determination is made that the document was opened by a reviewer, rather than the author. The Reply with Changes button facilitates the review cycle by automating the process of returning the document to the document author. The reviewer can edit the document and the reviewer's changes can be tracked to highlight the changes when the reviewed document is opened by the author. Once the user is finished making changes, the user can click on the Reply with Changes button to return the document to the author.

When the Reply with Changes button has been pressed, the email note associated with the reviewed document (i.e., the email note received from the document author), can be determined by using the email EntryID and/or email StoreID that is stored in the document. Once the received email note has been located, a reply note can be created and displayed to the user. If the received email note cannot be found, then a new email note can be created and the author's email address, and author's display name can be used to return the document to the author, via the new email note. Advantageously, because the identifying characteristics of the email note have been stored with the review document, the Reply with Changes button provides a quick and easy means for the reviewer to transmit the reviewed document to the author.

When the author receives the returned, reviewed document, the author can open the document as described above. At the time the document is opened, a determination can be made as to whether the RCID stored therein matches the RCID in a configuration file and/or registry. If it does, then it is assumed that the document is being opened by the document author, rather than another reviewer. At this point, the reviewing tools display flag can be checked. If the reviewing tools display flag is set, then it can be assumed that the author has previously opened the document and the reviewing tools need not be shown. On the other hand, if the reviewing tools flag has not been set, then the reviewing tools may be shown for use by the author. If the reviewing tools are shown to the author, then the reviewing tools flag is set.

The author can conclude the review cycle by clicking an "End Review" button. The "End Review" button is included in the reviewing tools displayed to the author when the author opens the reviewed document for the first time. The End Review command removes the RCID from the registry/configuration file, effectively removing the document from the review cycle.

The various aspects of the present invention may be more clearly understood and appreciated from a review of the following detailed description of the disclosed embodiments and by reference to the drawings and claims.

DETAILED DESCRIPTION

In an exemplary embodiment of the present invention, a method is provided for automating a document review cycle by providing reviewing tools on a context-sensitive basis. The present invention can operate within the environments of a document management system, a link-based document collaboration system (e.g., common server), or an attachment-based collaboration system. By generating a review cycle identification number (RCID) and by maintaining other information about the review cycle in a configuration file, the present invention distinguishes between an original author and a reviewer and can provide the appropriate prompts and reviewing tools to automate the document review process.

A review cycle begins with a document author's transmitting an original document to one or more reviewers and ends with the merging of the last reviewer's changes into the original document. Generally, the review cycle is begun by a trigger. A document author can trigger the beginning of a review cycle by choosing to send the original document to a recipient by email. This command is typically available in the menu structure of most document editors and/or email clients. Typically, the author can choose whether to send the document as an attachment or a link. The review cycle can also be triggered by an author selecting to send an original document for review within the context of a document management system.

Figure 1:
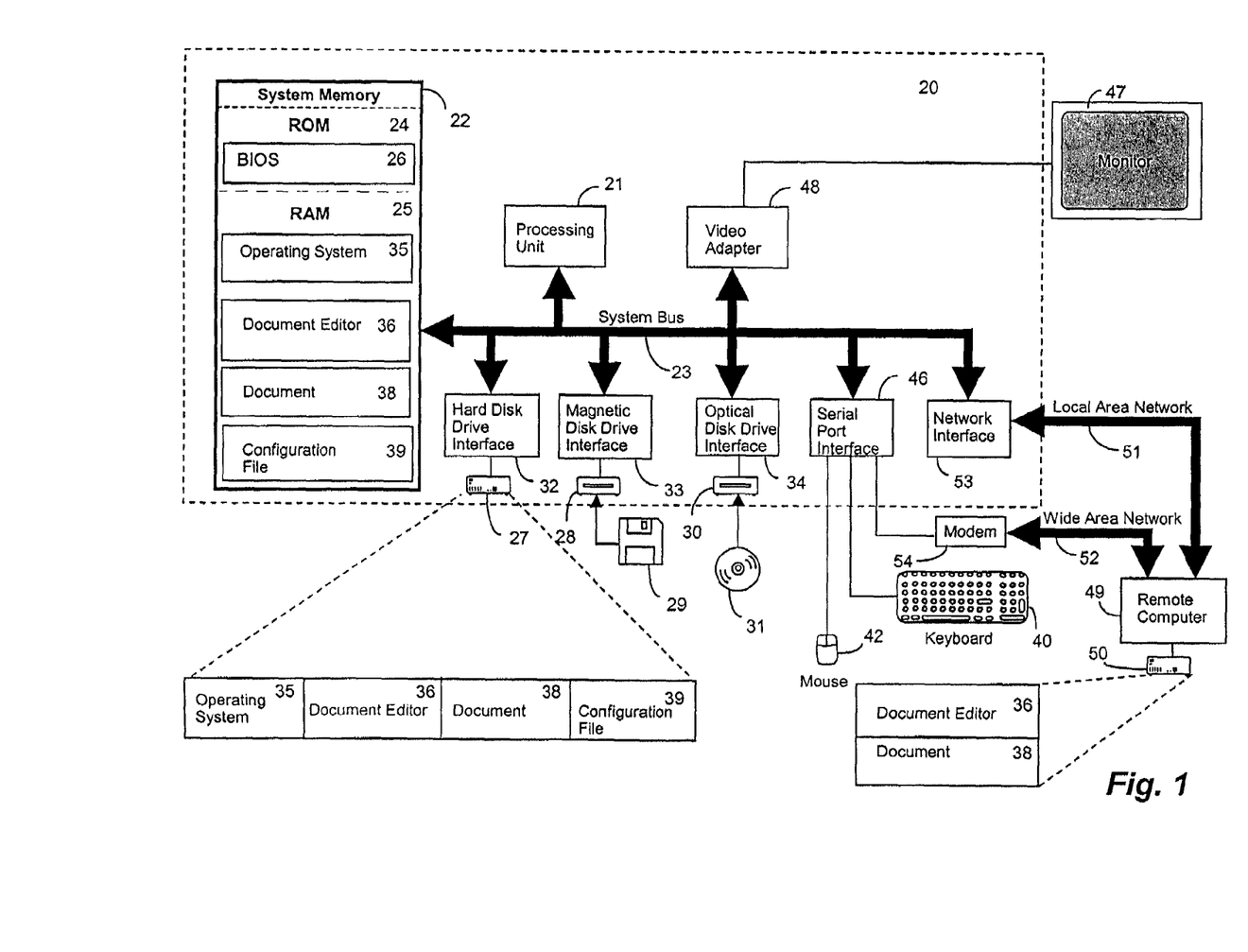
FIG. 1 is a block diagram illustrating an exemplary operating environment for implementation of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that helps to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, one or more data files 60 may be stored in the RAM 25 and/or hard drive 27 of the personal computer 20.

A number of program modules may be stored on hard disk 27, magnetic disk 29, optical disk 31, ROM 24, or RAM 25, including an operating system 35, a document editor 36, an electronic document 38, and a configuration file 38. Program modules include routines, sub-routines, programs, objects, components, data structures, etc., which perform particular tasks or implement particular abstract data types. Aspects of the present invention may be implemented as an integral part of the document editor 36 or as a part of another application program, such as an email application program (email client). The document editor 36 generally comprises computer-executable instructions for creating and modifying an electronic document. The configuration file program module 39 generally comprises computer-executable instructions for setting and maintaining a user's preferences regarding, among other things, the operation of the document editor.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A display device 47 may also be connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to personal computer 20, only a memory storage device 50 has been illustrated in the figure. The logical connections depicted in the figure include a local area network (LAN) 51 and a wide area network (WAN) 52. Such networking environments are commonplace in offices, enterprise-wide computer networks, intranets, and the Internet.

When used in a LAN networking environment, personal computer 20 is connected to local area network 51 through a network interface or adapter 53. When used in a WAN networking environment, personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
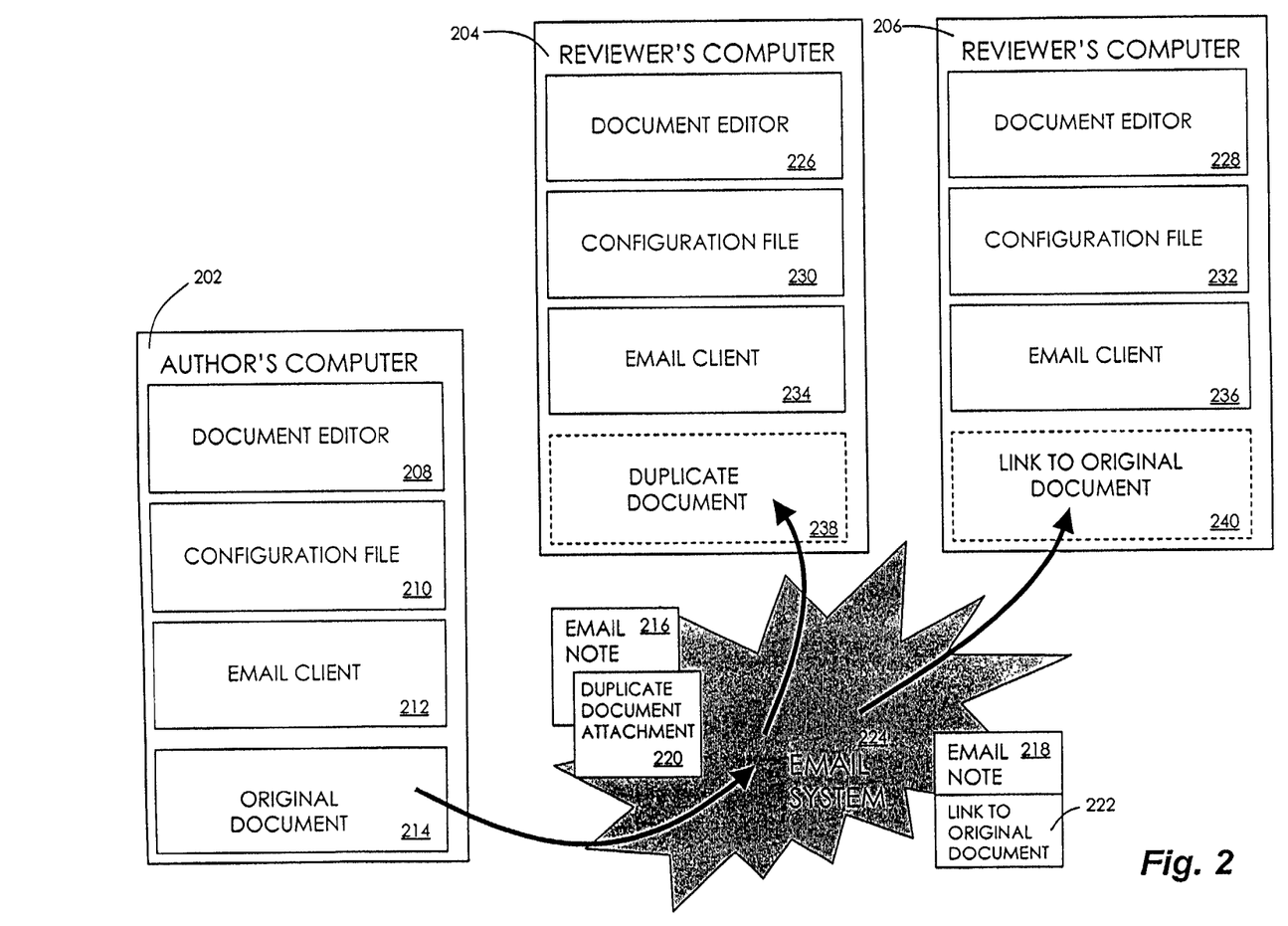
FIG. 2 is block diagram of some of the primary components of an exemplary embodiment of the present invention in the context of an exemplary review network that is an exemplary operating environment for implementation of the present invention.

FIG. 2 is block diagram of an exemplary review network. The review network depicted consists of three computers 202–206. The Author's Computer 202 has a document editor 208, a configuration file 210 an email client 212, and an original document 214. The document editor can be used to create (author) and modify the original document 214. Various user preferences, such as whether the author's name is added to a review document or not, can be stored in the configuration file 210. Email notes 216, 218 can be sent to other users by use of the email client 212 in conjunction with an email system 224.

The review network also includes two Reviewer's Computers 204, 206. Each Reviewer's Computer includes a document editor 226, 228, configuration files 230, 232, and email clients 234, 236. Each of these components can be used on the Reviewer's Computer 204, 206, as described with respect to the Author's Computer 202.

In the block diagram of FIG. 2, the original document 214 is sent from the Author's Computer 202, via the email system 224, to the Reviewer's Computers 204, 206. Generally, documents can be sent in this manner as an attachment to an email note or as a link in an email note; the link identifying a shared document location. The email note 216 has a duplicate document attachment 220. This duplicate document attachment is a copy of the original document 214.

When the Reviewer's Computer 204 receives the email note 216, the duplicate document attachment 220 can be saved on the Reviewer's Computer 204 as a duplicate document 238. At that point, the duplicate document 238 can be modified by the document editor 226 on the Reviewer's Computer 204. Notably, the Reviewer's Computer 204 can transmit a copy (or link) of the duplicate document 238 back to the Author's Computer 202 in the same manner.

The email note 218 can be sent to the Reviewer's Computer 206 with a link to the original document 222. When the email note 218 arrives at the Reviewer's Computer 206, the link to the original document 222 can be saved on the Reviewer's Computer 206 as a link to the original document 240. Once the link has been made available to the Reviewer's Computer 206, the original document 214 can be accessed by the Reviewer's Computer 206 at the shared document location (not depicted). The document editor 228 can be used to modify the original document 214 in the shared document location. The email client 236 of the Reviewer's Computer can be used to transmit an email note to the Author's Computer 202 indicating that the original document 214 has been reviewed and/or edited.

The review cycle is the entire review process beginning with an author's transmitting the original document 214 to one or more reviewers and ending with the merging of the last reviewer's changes into the original document 214. Typically, a document author triggers the beginning of a review cycle by sending an attachment or link to the original document 214 to a reviewer by email, as described. A command to trigger the review cycle is typically available in the menu structure of the document 208 and/or the email client 212. The review cycle can also be triggered by an author selecting to send the original document 214 for review within the context a document management system. The author may trigger the review cycle by sending an original document as a link in an email note or an attachment to an email note and by setting a "Follow-up" flag on the email note to "Review". It will be appreciated by those of ordinary skill in the art that the present invention can be used to automate a review cycle, regardless of any particular triggering mechanism.

Figure 3:
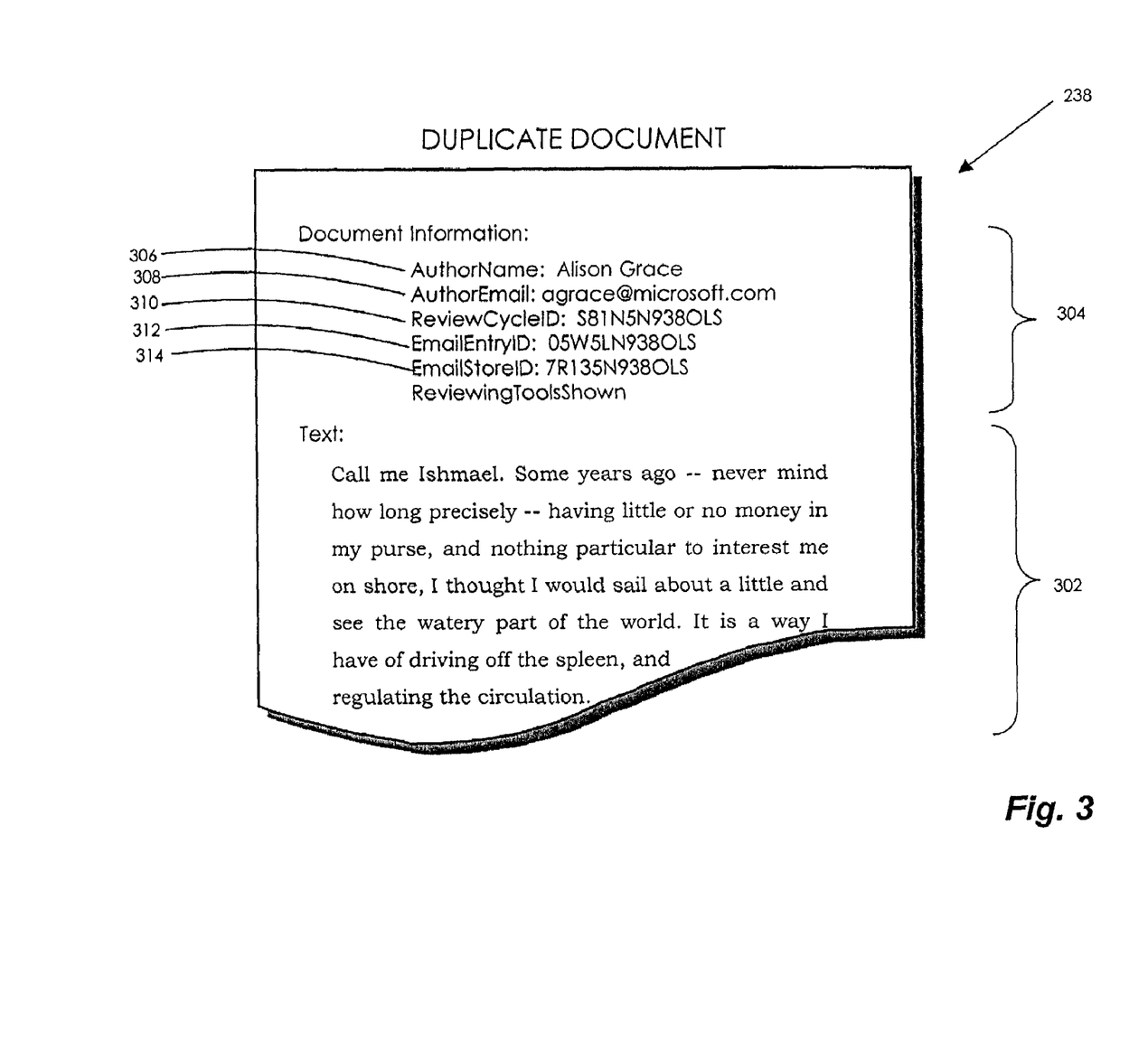
FIG. 3 is a graphical depiction of an electronic document of an exemplary embodiment of the present invention.

FIG. 3 depicts an exemplary electronic duplicate document attached to an email for sending to a reviewer. In addition to the text 302, normally found in an electronic document, the duplicate document 238 also contains document information 304. Generally, the document information 304 can include any information that is used by the document editor 208, the email client 212 or any other application or process that can act on or process the duplicate document 238. In the duplicate document 238 depicted in FIG. 3, the AuthorName may be stored in an "AuthorName" field 306. The document information 304 may also maintain the AuthorEmail address in an "AuthorEmail" field 308. Additionally, the document information 304 may include a Review Cycle ID (RCID) 310. As stated above, the document information 304 can include virtually any information that is helpful to processing the document.

Notably, the document information may be attached or added to the duplicate document 238 at the time that the duplicate document 238 is attached to an email note by the author, to send to reviewers. Additionally, if a reviewer has opened the duplicate document 238 after receiving it as an attachment, then a ReviewingToolsShown flag 316 may also be added to the duplicate document 238. The "EmailEntryID" field 312 and the "EmailStoreID" field 314 can also be added and used to store information pertaining to an email to which the document may have once been an attachment. An email subject line (not depicted) may also be stored in the document information 304 portion of the duplicate document 238. The ReviewingToolsShown flag 316 is discussed in more detail in connection with FIGS. 4–7.

Figure 4:
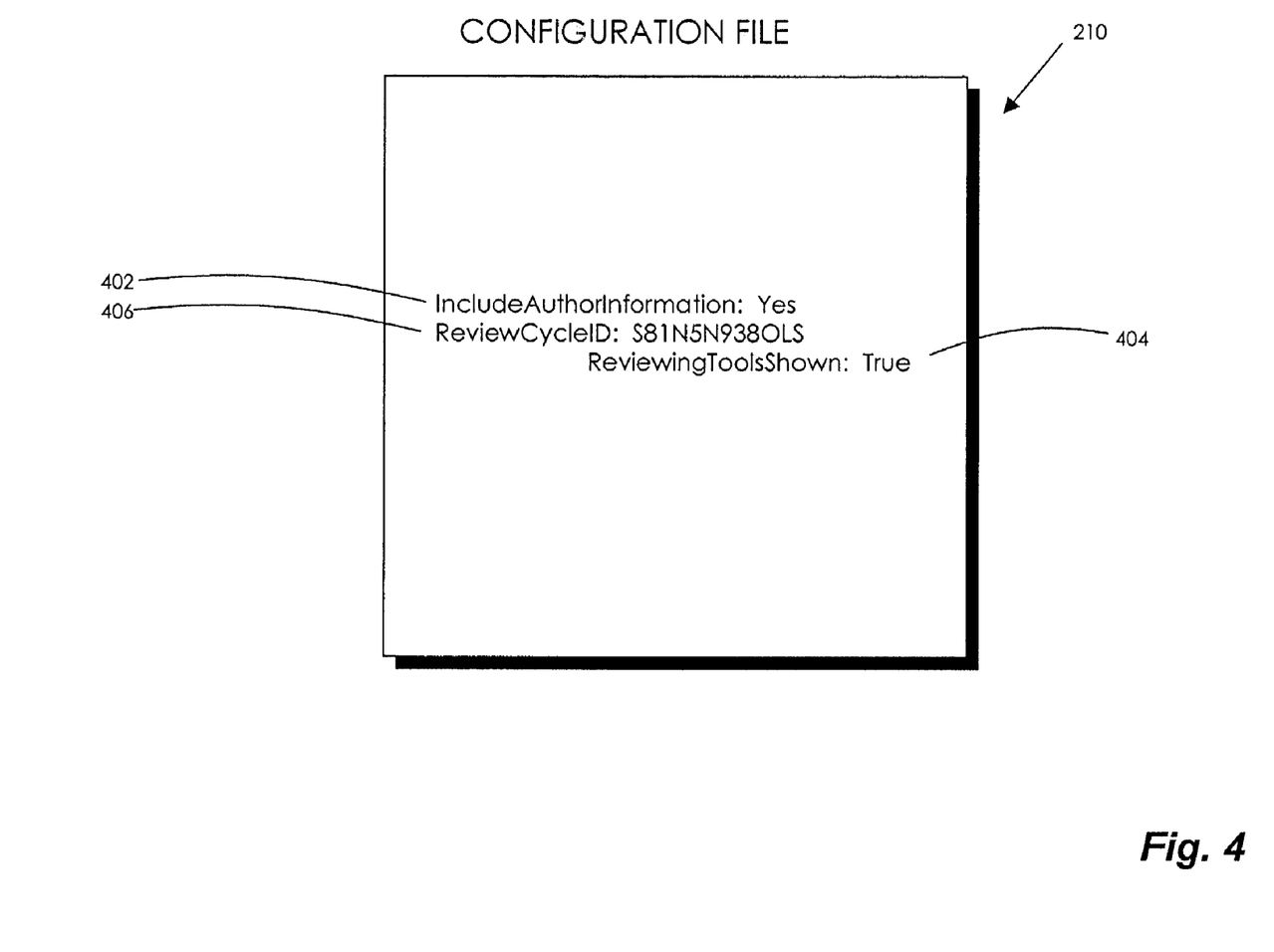
FIG. 4 is a graphical depiction of a configuration file of an exemplary embodiment of the present invention.

A "ReviewCycleID" field 310 is depicted in the duplicate document 238 of FIG. 3. The ReviewCycleID field 310 is used in an exemplary embodiment of the present invention to identify the location of the duplicate document 238 and to identify the computer on which the duplicate document 238 was created (authored). Various other identifying characteristics could be embodied within the ReviewCycleID. Virtually any form of encoding can be used to protect the information embodied in the ReviewCycleID for privacy purposes. Encoding information is well known to those skilled in the computer arts. As will be discussed in more detail below, the ReviewCycleID is associated with an duplicate document 238 and can be used by an embodiment of the present invention to determine whether the current editor of a document is the author of the document or is a reviewer of the document. Additionally, the ReviewCycleID can be used to determine a document's status in a review cycle. This is useful for automating the review cycle by providing tools when they are most needed in a context-sensitive manner. FIG. 4 depicts a Configuration File 210 which can be used by an exemplary embodiment of the present invention to store user preferences. The Configuration File 210 depicted in FIG. 4 includes an "IncludeAuthorInformation" field that is used to maintain a user's preference as to whether the user's name and/or other identifying characteristics should be stored as document information 304 in association with an original document 214. Those skilled in the art will appreciate that various other kinds of user preferences can be stored in the configuration file 210. In an exemplary embodiment of the present invention, various user preferences can be stored to enable automation of a review cycle. For example, the Configuration File 210 can store one or more ReviewCycleIDs in a ReviewCycleID field 406. As discussed above in connection with FIG. 3, a user's preference as to the inclusion of user information in electronic documents can be stored in an IncludeAuthorLnformation field 402. In an exemplary embodiment of the present invention, a single IncludeAuthorInformation field 402 will affect all documents sent using the email client. That is, either all documents attached to an email note will have the author information stamped thereon or all will not. The Configuration File 210 can also store a Boolean value (i.e. true/false) to indicate whether a reviewing toolbar has been displayed to a user in a ReviewingToolsShown field 404. The ReviewingToolsShown field 404 can be associated with a ReviewCycleID 406. The Configuration File 210 can store multiple pairs of these fields, so that the ReviewCycleID field 406 and the ReviewingToolsShown field 404 can be maintained on a per-document basis.

As will be described in more detail in connection with FIGS. 5–10, the user preferences 402–406 can be used to determine whether an author or a reviewer is editing a particular document. Moreover, the user preferences 402–406 can be used to facilitate the author/reviewer's review and/or editing of the document. The Configuration File 210 can be stored as a single, global file affecting all documents on a particular computer (e.g., a registry). Alternatively, the Configuration File 210 can be stored as a data file associated with the original document 214 or with a duplicate document 238. In either case, the Configuration File 210 can be used by an exemplary embodiment of the present invention to maintain review cycle information on a per-document and per-user basis.

When a document is edited using a document editor, a review toolbar can be displayed which provides the user with various tools for reviewing the document (reviewing tools). The toolbar is most useful to an author or reviewer when it is displayed the first time the user opens a document (in the review cycle) for editing. Some of the toolbar's features may include a text highlighting tool, a text underlining tool, change tracking tools, and tools for adding or editing comments (or web discussions). In an exemplary embodiment of the present invention, the review toolbar also includes a "Reply with Changes" button that is displayed to a reviewer and can be used to transmit the reviewed document back to an author. The operation of this button is described in more detail in connection with FIGS. 5–10. If the reviewer removes the review toolbar from the display or upon a subsequent opening of the document, the review toolbar will not be displayed. Whether the toolbar has been displayed or not is determined by the ReviewingToolsShown field 404 depicted in the Configuration File 210 of FIG. 4. Reviewing tools are a well-known aspect of document editors.

Figure 5:
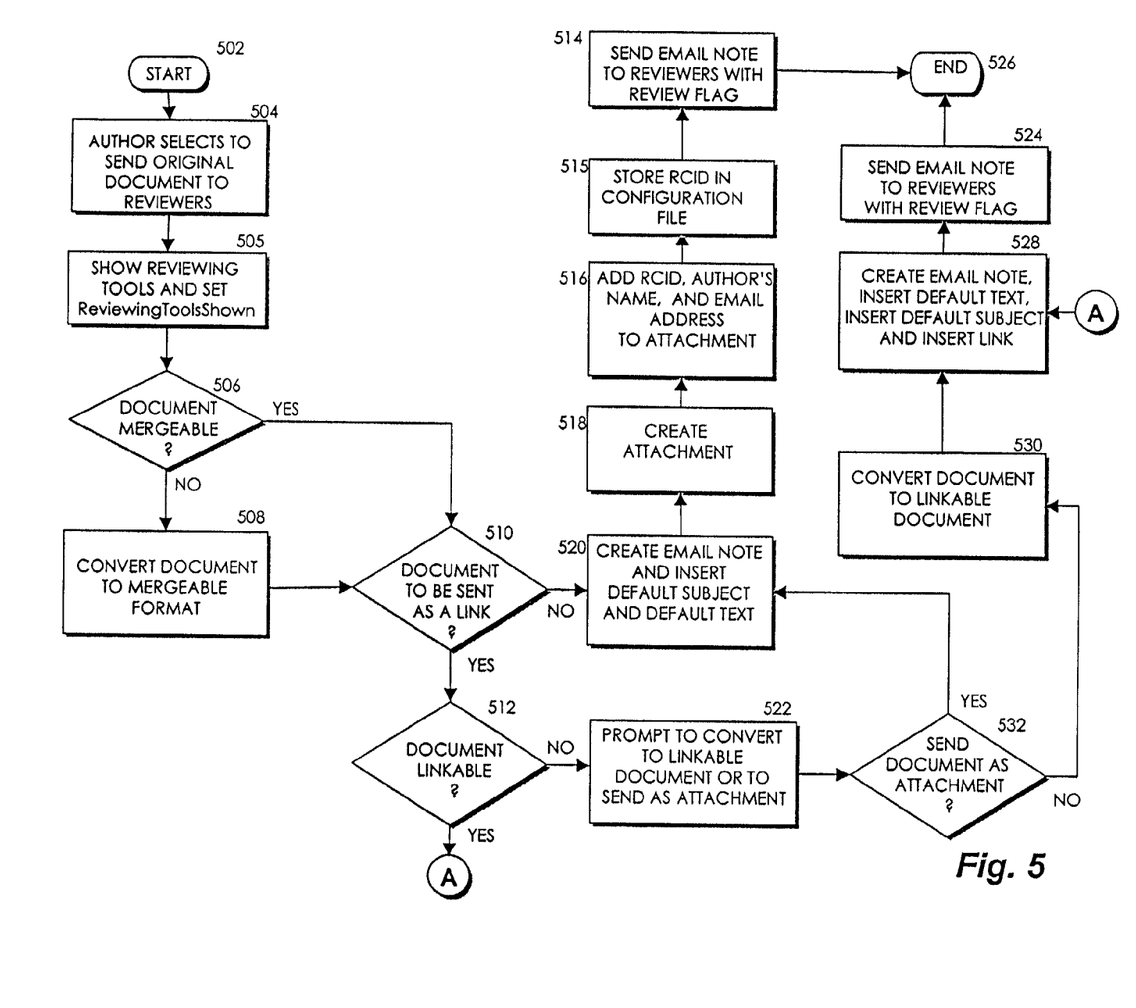
FIG. 5 is a flow chart illustrating an exemplary method for sending via email note an original document as an attachment or as a link to a shared document location to one or more reviewers.

FIG. 5 depicts a flow chart of a method that is an exemplary embodiment of the present invention. The flow chart of FIG. 5 depicts a method for sending via email note an original document as an attachment or as a link to a shared document location to one or more reviewers. The method begins at step 502 and proceeds to step 504. At step 504, the author selects to send the original document to one or more reviewers. Within the context of a document editor, the author can make this selection by choosing a menu command for sending a document to a reviewer or routing recipient. The author may also use a menu command to send the document to mail recipients for review. Additionally, within the context of a document management system, the author may send a link with a message indicating the author's desire that the document located at that link be reviewed by the recipient.

The method proceeds from step 504 to decision block 505. At step 505, reviewing tools are displayed to the document author and a ReviewingToolsShown field is set to indicate that the author has been shown the reviewing tools. As discussed above, reviewing tools may include may include a text highlighting tool, a text underlining tool, change tracking tools, and tools for adding or editing comments (or web discussions). The method then proceeds from step 505 to decision block 506.

At decision block 506, a determination is made as to whether the document is mergeable. Generally, document editors provide various means for merging changes from a review document into an original document. In order for this to work properly, however, both documents must be in a format that can be processed by the document editor's merging function. For example, document editors in the Microsoft Office Suite of application programs marketed by Microsoft Corporation of Redmond, Wash., typically require that the review document and the original document be in a binary file format (BIFF) in order to merge the documents.

In addition, the changes made to a reviewed document must be tracked in order to determine what changes need to be made to an original document to effect a merger of the two documents. A document is considered to be mergeable, if change tracking can be performed on the document. In the spreadsheet application program, Microsoft Excel, marketed by the Microsoft Corporation of Redmond, Wash., a spreadsheet document must not be a "shared" document in order for the document to be mergeable. In the multimedia presentation application program, Microsoft PowerPoint, marketed by the Microsoft Corporation of Redmond, Wash., a presentation document must have a baseline in place (defining the state of the original document), in order for the document to be mergeable. In both of these examples, the documents produced by these document editors can be converted to a mergeable state if the original document exists in an un-mergeable state.

Returning now to decision block 506, if a determination is made that the original document is not mergeable, then the method branches to step 508. At step 508, the document is converted to a mergeable format. In an alternative embodiment of the present invention the author can be prompted to convert the document. If the author chooses not to convert the document, then the method could be ended or the un-mergeable document could be sent to the reviewer despite the un-mergeable status of the document. In cases where the reviewer is not making changes to the document, then it is not necessary that the document is in mergeable format.

Returning now to decision block 506, if a determination is made that the document is mergeable, then the method proceeds to decision block 510. At decision block 510, a determination is made as to whether the document is to be sent as a link. If the document is not to be sent as a link, then an assumption is made that the document is to be sent as an attachment and the method branches to step 520. On the other hand, if the document is to be sent as a link, then the method branches to decision block 512. At decision block 512 at determination is made as to whether the document is linkable. Generally, a document is linkable if it is in a shared document location. Shared document locations include any uniform resource locator (URL) to which both the author and the reviewer have access, as well as any disk location to which the author and reviewer have access. A document is not linkable if one or more of the reviewers to which the author is sending the document cannot access the shared document location. If a determination is made that the document is linkable, then the method branches to step 528, via connectors A. At step 528, an email note is created and the link is inserted into the note. The method then proceeds to step 524 and the email note is sent to the reviewers identified by the author. The method then branches to step 526 and ends. In an alternative embodiment, the author may be prompted to send the document as an attachment (as well as a link), to avoid sending a link to one or more reviewers that do not have access to the document location.

Returning now to decision block 512, if a determination is made that the document is not linkable, then the method branches to step 522. At step 522, the author is prompted to convert the document to a linkable document or to send the document as an attachment. The method then proceeds to decision block 532, wherein a determination is made as to whether the document should be sent as an attachment.

In an alternative embodiment of the present invention, the determination as to whether the document is linkable is made as part of decision block 510. That is, if the document is not linkable, then the method of this alternative embodiment will only follow the "NO" branch to step 520. Accordingly, if the document is to be sent as a link, then the method of this alternative embodiment will follow the "YES" branch to step 528 (via connectors A), skipping decision block 512. In this alternative embodiment, no conversion to a linkable document is made.

If the user chooses to send the document as a link (i.e., not as an attachment), the method branches from decision block 532 to step 530. At step 530, the document is converted to a linkable document. This conversion can be done by permitting the user to relocate the document to a shared document location. The method then proceeds to step 528 and an email note is created and the link is inserted in the email note. At step 528, default body text (e.g., "Please review the identified document.") and a default subject line (e.g., "Please review") can also be added. The method then proceeds to step 524 and the email note is sent to the reviewers identified by the author. In an alternative embodiment, the author may be prompted to authorize sending the document as a link in addition to sending the document as an attachment, where it is determined that the document is linkable (i.e., in a shared location). The method then proceeds to step 526 and ends.

Returning now to decision block 532, if the user selects to send the document as an attachment, rather than a link, the method branches to step 520 and a new email note is created. Notably, step 520 is also reached when a determination is made in decision block 510 that the document should be sent as an attachment rather than a link. The method proceeds from step 520 to 518, wherein an attachment of the document is created. The attachment is associated with the email note in the conventional manner. The method then proceeds to step 516 and a Review Cycle ID (RCID), the author name, and the author's email address are added to the attachment. As described above, the author can typically suppress the addition of the author's name and other identifying information, by setting the proper field in a configuration file.

The Review Cycle ID (RCID) can be generated as described above in connection with FIGS. 3 and 4. In short, the RCID can be used to identify the author's computer, the location of the original document, and/or other characteristics relevant to a review cycle. The addition of the author's email address and name can be suppressed as described above.

The method then proceeds to step 515 and the RCID is stored in a configuration file associated with the author's computer. The method then proceeds to step 514 and the email note is sent to one or more reviewers identified by the author. The method then proceeds to step 526 and ends.

Figure 6:
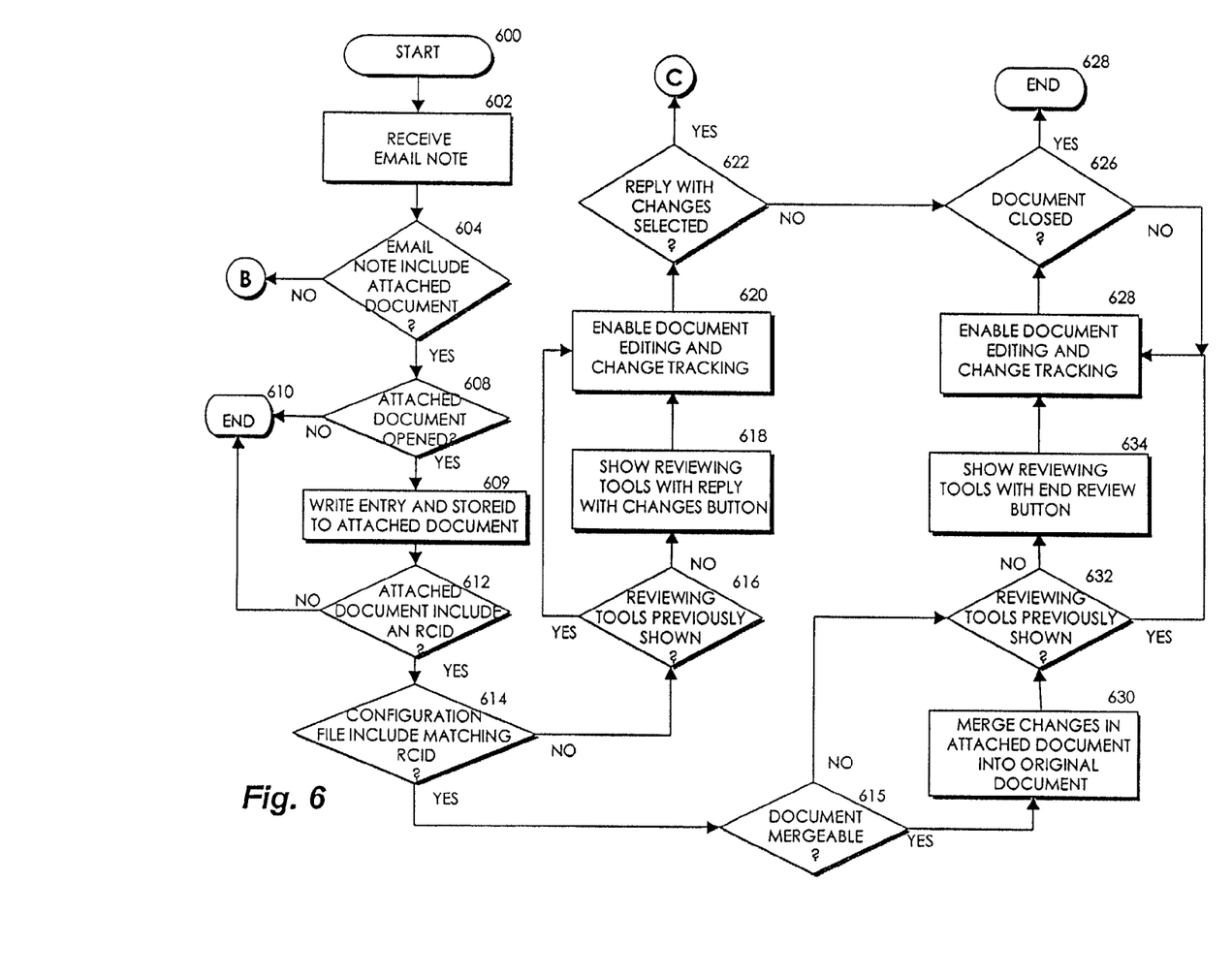
FIG. 6 is a flow chart illustrating an exemplary method for processing a reviewed document received as an attachment to an email note from the prospective of an author or a reviewer.

FIG. 6 depicts a method for processing a document received as an attachment to an email note from the author or a reviewer. The method starts at step 600 and proceeds to step 602. At step 602, the email note is received. The method then proceeds to decision block 604. At decision block 604, a determination is made as to whether the email note includes an attached document. If the email note does not include an attached document, then the method branches to decision block 700 of FIG. 7, via connectors B. On the other hand, if the email note includes an attached document, the method branches to decision block 608.

At decision block 608, a determination is made as to whether the attached document has been opened. If the attached document has not been opened, then the review cycle is not initiated and the method branches to step 610 and ends. If the attached document is opened, then the method branches to step 609 and the EntryID and StoreID are written to the attached document. The method then proceeds to decision block 612. At decision block 612 a determination is made as to whether the attached document includes an RCID. If the attached document does not include an RCID, then the automated review cycle is not initiated and the method branches to step 610 and ends. If the attached document includes an RCID, then the method branches to decision block 614.

At decision block 614, a determination is made as to whether a configuration file includes an RCID that matches the RCID found in the attached document. If the configuration file does not include a matching RCID, then an assumption is made that a reviewer (rather than a user) has opened the document and the method branches to decision block 615. On the other hand, if a determination is made that the Configuration File includes a matching a RCID, then an assumption is made that the author (rather than a reviewer) has opened the document. In this case, the method branches to step 615.

At decision block 615, a determination is made as to whether the document is mergeable. If the document is not mergeable, then the method branches to decision block 632. If the document is mergeable, then the method branches to step 630.

At decision block 616, a determination is made as to whether the reviewing tools (e.g. a review toolbar) has been previously shown to the reviewer. If the tools have been previously shown, the method branches to step 620. If the reviewing tools have not been previously shown, then the method branches to step 618. At step 618, the reviewing tools are displayed to the reviewer with a "Reply with Changes" button. The method then proceeds to step 620 and document editing and change tracking are enabled. Notably, step 620 is also reached when a determination is made at decision block 616 that the reviewing tools have been previously shown.

The method then proceeds to decision block 622. At decision block 622, a determination is made as to whether the reviewer has selected the Reply with Changes button. As discussed above, the Reply with Changes button can be used to transmit changes made by the reviewer to the attached document back to the document author. When the Reply with Changes button is selected, the method branches to step 800 of FIG. 8, via connectors C. If the reviewer does not select the Reply with Changes button, then the method branches to decision block 626.

At decision block 626, a determination is made as to whether the reviewer closes the document. If the reviewer does not close the document then the method branches to step 628 and document editing and change tracking remain enabled. The method loops back to decision block 626 and continues monitoring for the reviewer to close the document. If the reviewer closes the document, then the method branches from decision block 626 to step 628 and ends. Of course, the reviewer may select the Reply with Changes button (or any other command) at any time during document editing and change tracking.

Returning now to decision block 614, if a determination is made that the Configuration File includes an RCID matching the RCID of the attached document, the method branches to decision block 615. As discussed above, this determination is the basis of an assumption that the author (rather than the reviewer) has opened the attached document. At decision block 615, a determination is made as to whether the document is mergeable. If the document is not mergeable, then the method branches to decision block 632. If the document is mergeable, then the method branches to step 630.

At step 630, the changes in the attached document are merged into the original document. In alternative embodiment of the present invention, the author may be prompted to authorize or suppress the merging of the changes at this point. The method can identify the original document into which the changes will be merged by decoding the RCID. As discussed above, the RCID can be used to identify the location of the original document.

The method then proceeds to decision block 632. At decision block 632, a determination is made as to whether the reviewing tools have been previously shown. If the reviewing tools have not been previously shown the method branches to step 634 and the reviewing tools are displayed with an "End Review" button and without the Reply with Changes button. The Reply with Changes button is not useful to the author, as the author has solicited the changes from one or more reviewers. On the other hand, clicking on the End Review button will remove the RCID from the document and from the configuration file, effectively removing the original document from the automated review cycle. The method then proceeds to step 628 and document editing and change tracking are enabled.

Returning to decision block 632, if a determination is made that the reviewing tools have been previously shown, then the reviewing tools will not be displayed and the method branches to step 628. As discussed above, document editing and change tracking are enabled at step 628. The method then proceeds to decision block 626 and monitors for a document close command from the author, as described above in connection with the reviewer.

Figure 7:
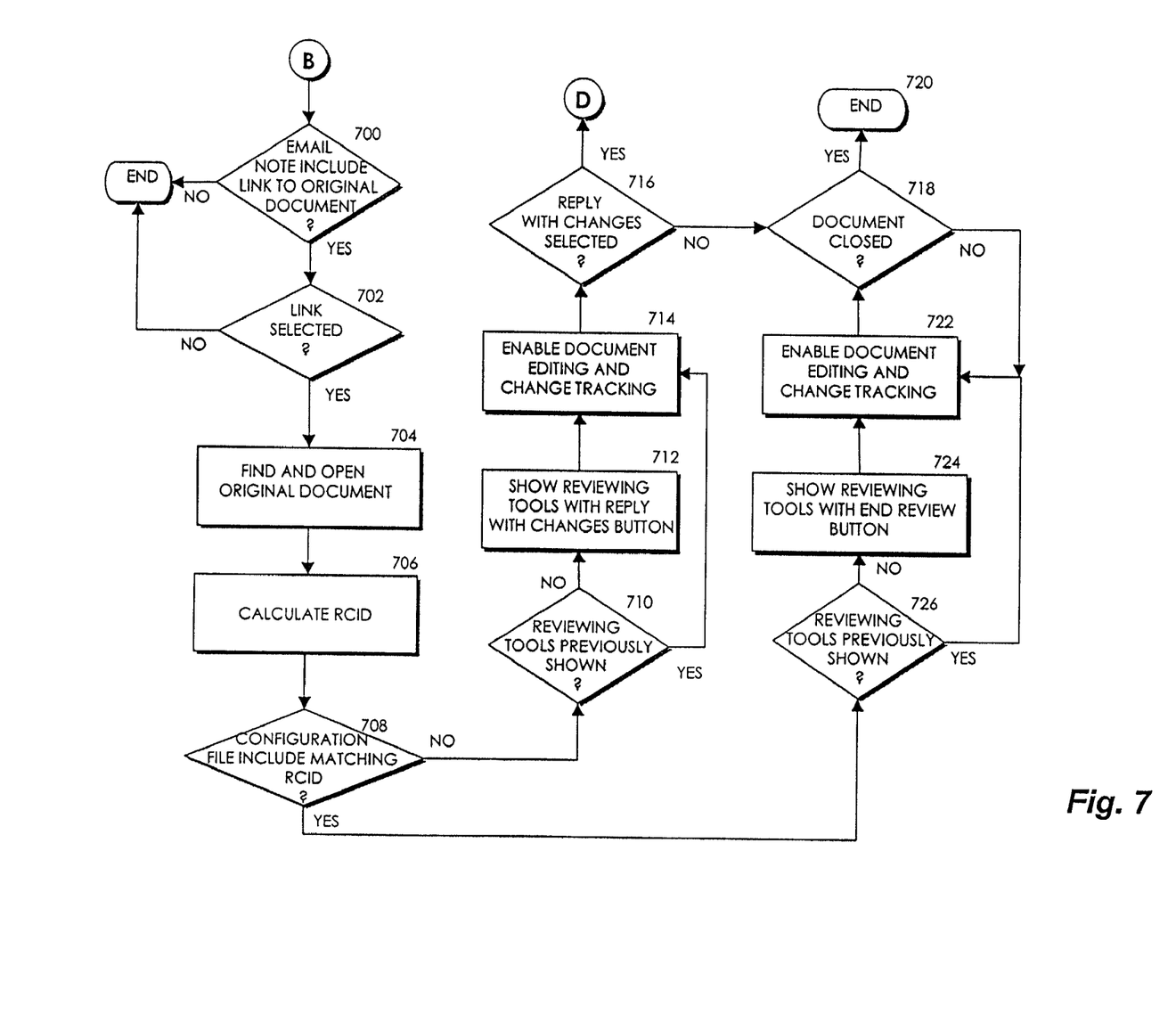
FIG. 7 is a flow chart illustrating an exemplary method for providing a review cycle for a document that has been sent to a user as a link.

FIG. 7 depicts a method for providing a review cycle for a document that has been sent to a user as a link. The method of FIG. 7 is reached by connectors B from decision block 604 of FIG. 6.

The method of FIG. 7 begins at decision block 700. At decision block 700, a determination is made as to whether the email note received by the reviewer includes a link to an original document. If the email note does not include a link to an original document, the method branches to step 701 and ends. Recall that, at this point, a determination has been made that the email note neither contained an attached original document nor contained a link to an original document. Thus, no review cycle is required.

If a determination is made at decision block 700 that the email note includes a link to an original document, then the method branches to decision block 702. At decision block 702, a determination is made as to whether the reviewer selects the link. If the reviewer does not select the link, the method branches to step 701 and ends. On the other hand, if the reviewer selects the link, then the method branches to step 704. At 704 the original document is found and opened. The original document is found by following the link included in the mail note. In alternative embodiment of the present invention, an error dialog could be presented to the reviewer in the case in which the link was faulty (i.e., did not identify a document location to which the reviewer had access).

The method then proceeds from step 704 to step 706. At step 706, the RCID is calculated for the opened original document. As discussed above, the RCID can be calculated, based on information pertaining to the computer on which the document is stored and on the path of the original document. For example, the RCID may be a hash value of the path of the original document. The method then proceeds to decision block 708. At decision block 708, a determination is made as to whether the configuration file includes an RCID that matches the calculated RCID. If the configuration file includes a matching RCID, then an assumption is made that the author has followed the link to the original document and the method branches to decision block 726. On the other hand, if a determination is made at decision block 708 that the configuration file does not include a matching RCID, then an assumption is made that a reviewer has followed the link to the original document and the method branches to decision block 710.

At decision block 710, a determination is made as to whether the reviewing tools have been shown previously. If the reviewing tools have been shown previously, then the method branches to step 714 and document editing and change tracking are enabled. On the other hand, if a determination is made at decision block 710 that the reviewing tools have not been previously shown, then the method branches to step 712 and the reviewing tools are shown with a Reply with Changes button. The previous determination that a reviewer has followed the link to the original document indicates that displaying the Reply with Changes button is appropriate. The method then proceeds to step 714 and document editing and change tracking are enabled.

The method then proceeds to decision block 716. At decision block 716, a determination is made as to whether the reviewer has selected the Reply with Changes button. If a determination is made that the reviewer has selected the Reply with Changes button then the method branches to step 900 of FIG. 9, via connectors D. If a determination is made that the reviewer has not selected the reply with changes button, then the method branches to decision block 718. At decision block 718, the method determines whether the document has been closed. If the document has not been closed, then the method branches to step 722 and document editing and change tracking continue to be enabled. The method continues monitoring for document close commands, Reply with Changes commands, and any other commands. If a determination is made at decision block 718 that the document has been closed, then the method branches to step 720 then ends.

Returning now to decision block 708, if a determination is made that the configuration file does not include a matching RCID, then the method branches to decision block 726. At decision block 726, a determination is made as to whether the reviewing tools have been previously shown. If the reviewing tools have been previously shown, the method branches to step 722 and document editing and change tracking are enabled. If the reviewing tools have not been previously shown, then the method branches to step 724 and the reviewing tools are shown without the Reply with Changes button.

As noted above, this branch of the flow chart of FIG. 7 is followed when the assumption has been made that the author has followed the link to the original document. Accordingly, the Reply with Changes button is inappropriate and, therefore, suppressed. Instead, the reviewing tools are displayed with an "End Review" button and without the Reply with Changes button. The Reply with Changes button is not useful to the author, as the author has solicited the changes from one or more reviewers. On the other hand, clicking on the End Review button will remove the RCID from the document and from the configuration file, effectively removing the original document from the automated review cycle. The method then proceeds to step 722 and document editing and change tracking are enabled. The method then proceeds to decision block 718 and proceeds further as described above.

In an alternative embodiment of the present invention, the original document may be a web page. Various reviewers may attach remarks to the web page as "web discussions." The "web discussions" feature of the Microsoft Office Suite, manufactured and marketed by Microsoft Corporation of Redmond, Wash. provides such web page reviewing capabilities. The review cycle of a web page may be automated in a similar way as the link-based review cycle described in connection with FIG. 7. A link to the original web page may be sent to reviewers via email note. When the original web page is accessed by the reviewer, any web discussions associated with the original web page may be analyzed to determine whether an RCID is associated therewith. If an RCID is associated with any of the web discussions, then the RCID can be compared with a configuration file associated with the author and/or reviewer to determine which reviewing tools (if any) to display to the user. Notably, a specialized toolbar may be associated with the web discussions. In this case, the Reply with Changes button and the End Review button may be displayed in the context of a web discussion toolbar, rather than with the reviewing tools described above.

Figure 8:
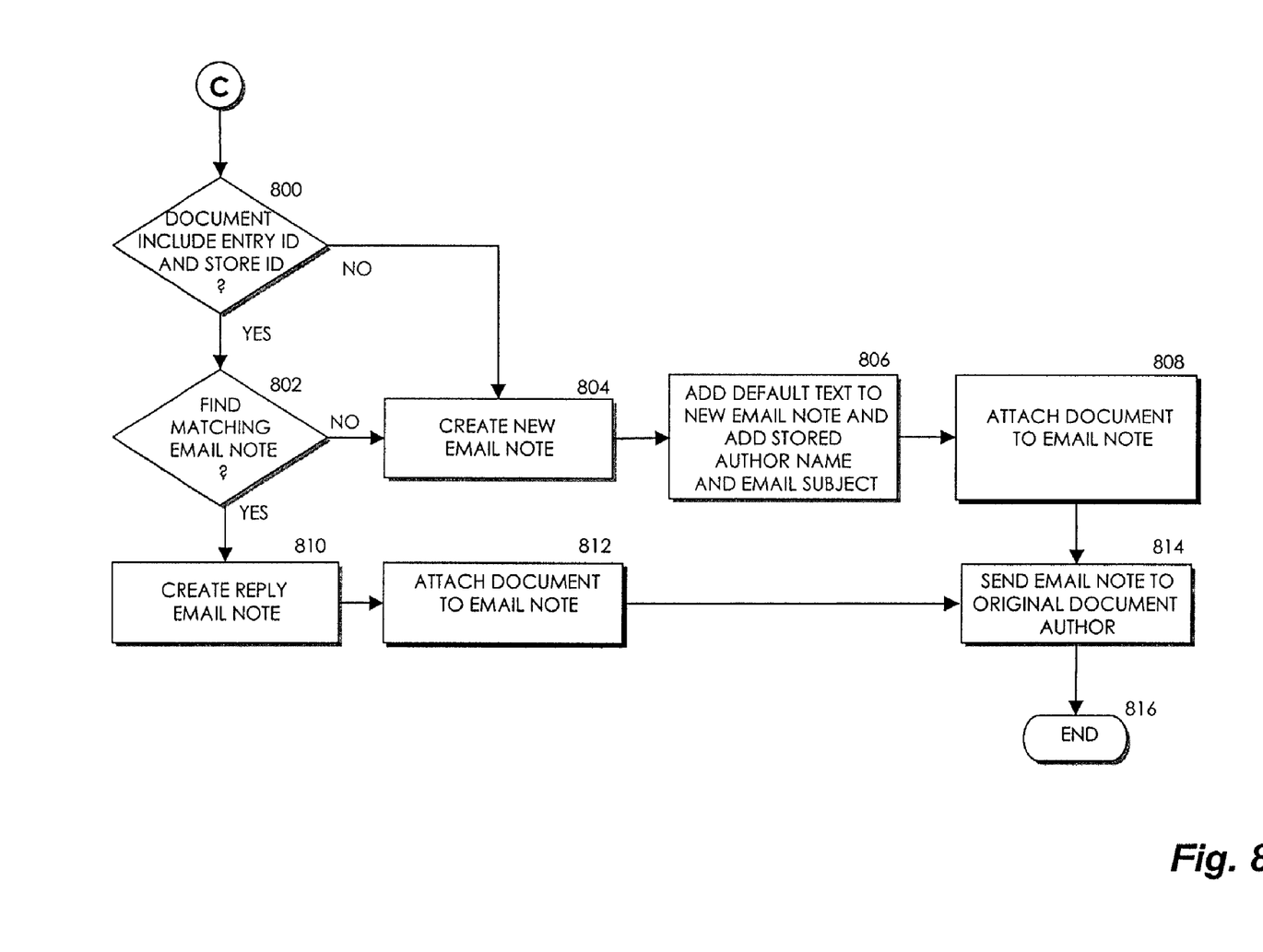
FIG. 8 is a flow chart illustrating an exemplary method for continuing a review cycle by returning a reviewer's changes to an author via email.

FIG. 8 depicts a method for continuing a review cycle by returning a reviewer's changes to an author via email. Recall that step 800 is reached when the method of FIG. 6 branches from decision block 622 to step 800 via connectors C. To review, the method of FIG. 6 has determined that a reviewer has selected to return a reviewed document as an attachment to the document's author. The method begins at decision block 800, wherein a determination is made as to whether the reviewed document includes an EntryID and a StoreID. As discussed above in connection with FIG. 3, the EntryID and StoreID can be used to identify a particular email note. Further, as discussed in connection with FIG. 5, the EntryID and the StoreID can be added to a document to associate that document with a particular email note. If a determination is made at decision block 800 that the document includes an EntryID and a StoreID then the method branches to decision block 802.

At decision block 802, a determination is made as to whether an email note can be found (within the user's email note folder structure) that is identified by the EntryID and the StoreID. If the email note can be found, then the method branches to step 810 and a reply email note is created using the information in the "To", "From", and "cc" fields found in the matching email note.

The method then proceeds to step 812 and the reviewed document is attached to the reply email note. The method then proceeds to step 814 and the reply email note is sent to the original document author with the changes made by the reviewer. The method then proceeds to step 816 and ends. Returning now to decision block 800, if a determination is made that the reviewed document does not include an EntryID or a StoreID, then the method branches to step 804. Likewise, if at decision block 802, a determination is made that an email note matching the EntryID and StoreID cannot be found, then the method branches to step 804. At step 804 a new email note is created (i.e., not a reply email note). The method then branches to step 806 and default text can be placed in the email note. For example, default text might include the text: "I have reviewed the attached document, please see my comments". Additionally, at step 806, the author name found in the document information portion of the original document can be used to populate the "To" field. Alternatively, the author's email address can be used for this purpose. Finally, at step 806, the email subject line can be retrieved from the reviewed document and placed in the "subject" field of the email note.

The method then proceeds to step 808 and the reviewed document is attached to the email note. The method then proceeds to step 814 and the email note is sent to the original document author. The method then proceeds to step 816 and ends.

Figure 9:
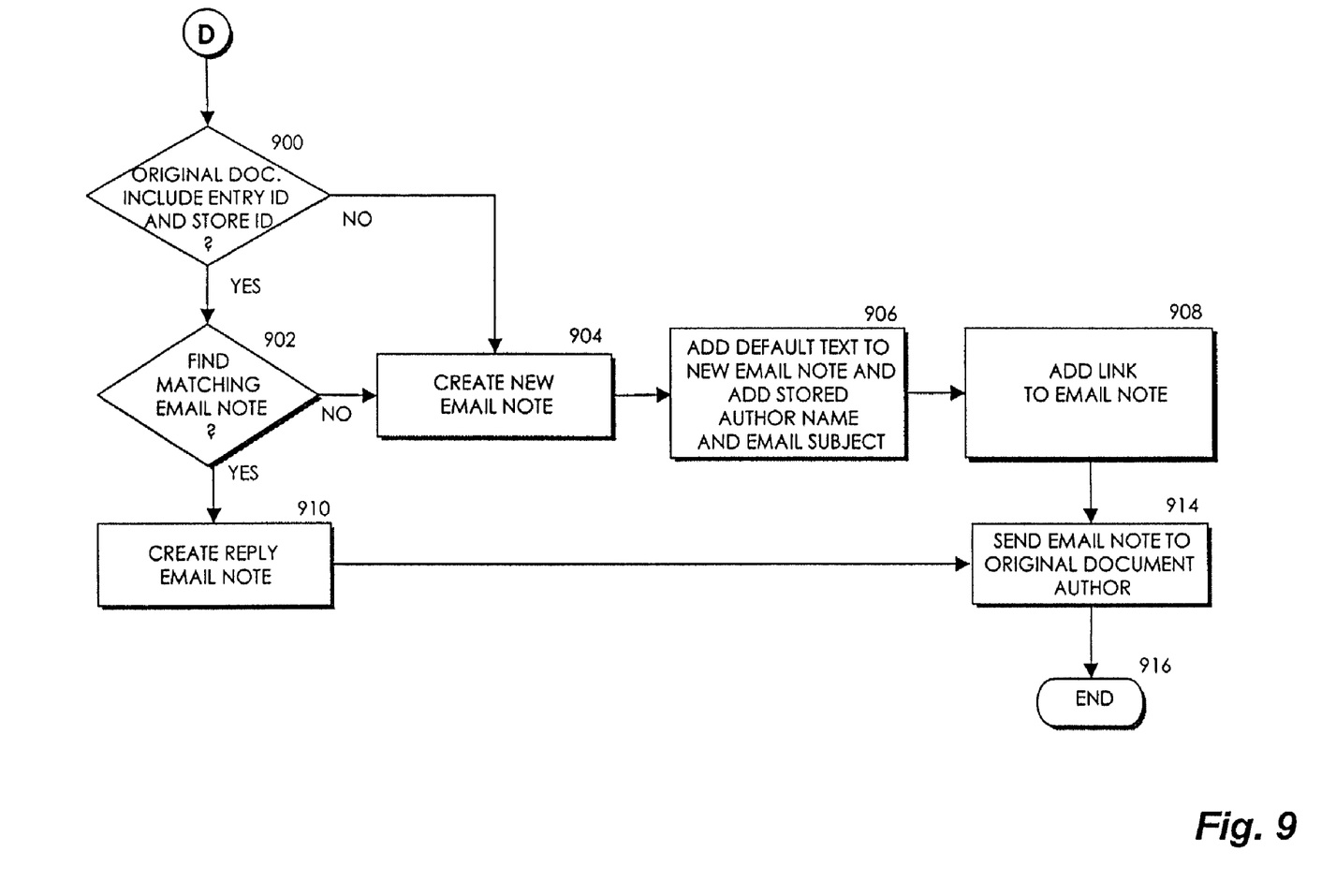
FIG. 9 is a flow chart illustrating an exemplary method for continuing a review cycle by revealing a reviewer's changes to an original document author via a link.

FIG. 9 depicts a method for sending a reviewer's changes to an original document author via a link. Recall that step 900 is reached when the method of FIG. 7 branches from decision block 716 via connectors D. Further recall that at this branch, the method of FIG. 7 has determined that a reviewer has selected to return the reviewer's changes to the author by sending the author a link to the original document.

The method at FIG. 9 begins at decision block 900. At decision block 900, a determination is made as to whether the original document (found at the shared document location identified by the link) includes an EntryID and a StoreID. If the original document includes an EntryID and a StoreID, the method branches to decision block 902 and a determination is made as to whether an email note is found that is identified by the EntryID and StoreID. If a matching email note is found, the method branches to step 910. At step 910, a reply email note is created using the information found in the matching email note. The method then proceeds to step 914 and the email note is sent to the original document author. The method then proceeds to step 916 and ends.

Returning now to decision block 900, if the original document does not include an EntryID or a StoreID, the method branches to step 904. At step 904, a new email note is created. Likewise, if a determination is made at decision block 902 that an email note identified by the EntryID and the StoreID cannot be found, then the method branches to step 904.

Once the new email note has been created, the method proceeds to step 906 and default text can be placed in the body of the email note. The default text may simply include a statement that the original document has been edited in its original shared document location. As described above in connection with FIG. 8, the "To" field and the "Subject" field can be populated with the author name and email subject line, respectively.

The method then branches to step 908 and the link is added to the email note. The method proceeds to step 914 and the email note is sent to the original document author. The method then proceeds to step 916 and ends.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for automating a document review cycle involving an author of an original document and a reviewer, the method comprising the steps of:

receiving an indication that the original document is to be sent from the author to the reviewer;

in response to the indication that the original document is to be sent to the reviewer:
displaying a first set of author reviewing tools,
associating an email note with the original document,
associating a first Review Cycle Identification Number (RCID) with the original document,
storing the first RCID in a configuration file, and
sending the email note to the reviewer;

receiving a reply email from the reviewer to the author, the reply email associated with a reviewed document;

comparing a second RCID associated with the reviewed document to the first RCID in the configuration file; and in response to a determination that the second RCID matches the first RCID, displaying a second set of author reviewing tools;

wherein the second set of author reviewing tools includes at least one tool that is separate and distinct from the first set of author reviewing tools.

2. A computer readable medium having stored thereon computer-executable instructions for performing the method of claim 1.

3. The method of claim 1, wherein the step of associating the email note with the original document, comprises attaching a duplicate of the original document to the email note, prior to sending the email note to the reviewer.

4. The method of claim 3, further comprising the steps of adding an author's name and an author's email address to the duplicate document.

5. The method of claim 3, further comprising the steps of adding an Email Identification Number (EntryID) and a Store Identification Number (StoreID) to the duplicate document, the EntryID and the StoreID operative to identify the email note.

6. The method of claim 1, wherein the step of associating the email note with the original document, comprises adding a link to the email note, the link identifying the location of the original document.

7. The method of claim 1, wherein the original document contains a first Review Cycle Identification Number (RCID).

8. The method of claim 1, further comprising the step of adding a default data to the email note, wherein the default data includes an instruction to the reviewer to review the original document.

9. The method of claim 1, wherein the RCID is generated by encoding an author identification number and an original document identification number into a single value.

* * * * *